United States Patent
Kao

(10) Patent No.: US 10,780,947 B2
(45) Date of Patent: Sep. 22, 2020

(54) AUTOMATIC RETURN STRUCTURE FOR CHAIN DETACHMENT OF BICYCLE

(71) Applicant: Hao Meng Bicycle (Shanghai) Co., Ltd, Shanghai (CN)

(72) Inventor: Yu-Sheng Kao, Shanghai (CN)

(73) Assignee: Hao Meng Bicycle (Shanghai) Co., Ltd, Shanghai (CN)

( * ) Notice: Subject to any disclaimer, the term of this patent is extended or adjusted under 35 U.S.C. 154(b) by 254 days.

(21) Appl. No.: 16/012,297

(22) Filed: Jun. 19, 2018

(65) Prior Publication Data

US 2019/0382079 A1 Dec. 19, 2019

(51) Int. Cl.
*B62M 9/16* (2006.01)
*B62M 3/16* (2006.01)

(52) U.S. Cl.
CPC ............... *B62M 9/16* (2013.01); *B62M 3/16* (2013.01)

(58) Field of Classification Search
CPC .. B62J 13/00; B62M 2009/007; B62M 9/138; B62M 9/16; Y10T 74/2165
USPC ........................................................ 474/144
See application file for complete search history.

(56) References Cited

U.S. PATENT DOCUMENTS

| | | | |
|---|---|---|---|
| 4,758,205 A * | 7/1988 | Durham | B62M 9/125 474/80 |
| 4,832,667 A * | 5/1989 | Wren | B62M 9/135 474/140 |
| 5,002,520 A * | 3/1991 | Greenlaw | B62J 13/00 474/140 |
| 5,003,840 A * | 4/1991 | Hinschlager | B62J 23/00 280/152.1 |
| 5,320,583 A * | 6/1994 | van Wingen born Looyen | B62J 13/00 474/144 |
| 5,335,928 A * | 8/1994 | Pong | B62M 3/003 280/259 |
| 5,460,576 A * | 10/1995 | Barnett | B62J 13/00 474/144 |
| 5,782,714 A * | 7/1998 | Osgood | B62J 23/00 474/144 |
| 6,354,973 B1 * | 3/2002 | Barnett | B62J 13/00 474/101 |
| 6,533,690 B2 * | 3/2003 | Barnett | B62J 13/00 474/116 |
| 7,753,815 B2 * | 7/2010 | Saifuddin | B62M 9/105 474/140 |

(Continued)

*Primary Examiner* — Henry Y Liu
(74) *Attorney, Agent, or Firm* — Thomas J. Nikolai; DeWitt LLP

(57) ABSTRACT

In an automatic return structure of a bicycle, a stopper block is mainly disposed on the other end of a crank different from a pedal, and a guide block is disposed on an inner surface of a middle portion of the crank. The stopper block may be formed with a groove on the other end of the crank. The guide block has an arced guide surface. Upon chain detachment, the stopper block blocks the chain, and then the pedal being pedaled makes the guide block lift up the chain to a location above the sprocket, so that the chain slides downward to teeth of the sprocket along the arced guide surface to perform automatic upshifting. The danger of chasing caused by the sudden slowdown or stop upon chain detachment can be avoided, the rider needs not to get off to perform manual upshifting, and riding convenience can be significantly enhanced.

11 Claims, 11 Drawing Sheets

(56) References Cited

U.S. PATENT DOCUMENTS

| | | | |
|---|---|---|---|
| 8,235,849 B2 * | 8/2012 | Cranston | B62J 13/00 |
| | | | 280/261 |
| 8,888,629 B2 * | 11/2014 | Ji | B62M 9/128 |
| | | | 474/144 |
| 8,961,342 B2 * | 2/2015 | Emura | B62M 9/136 |
| | | | 474/140 |
| 2002/0160869 A1 * | 10/2002 | Barnett | B62J 13/00 |
| | | | 474/144 |
| 2004/0009835 A1 * | 1/2004 | Heim | F16H 7/18 |
| | | | 474/78 |
| 2005/0284252 A1 * | 12/2005 | Fukui | B62J 13/04 |
| | | | 74/594.2 |
| 2006/0030440 A1 * | 2/2006 | Zmurko | B62M 9/16 |
| | | | 474/80 |
| 2006/0058139 A1 * | 3/2006 | Fry | B62J 13/00 |
| | | | 474/144 |
| 2008/0254929 A1 * | 10/2008 | Wesling | B62M 9/16 |
| | | | 475/182 |
| 2008/0293528 A1 * | 11/2008 | Paull | B62J 13/00 |
| | | | 474/144 |
| 2011/0230287 A1 * | 9/2011 | Savola | B62M 9/136 |
| | | | 474/80 |
| 2012/0142469 A1 * | 6/2012 | Barefoot | B62M 9/00 |
| | | | 474/139 |
| 2013/0217527 A1 * | 8/2013 | Graziosi | F16H 7/18 |
| | | | 474/140 |
| 2017/0045121 A1 * | 2/2017 | Staples | B62M 9/121 |

* cited by examiner

AUTOMATIC RETURN STRUCTURE FOR CHAIN DETACHMENT OF BICYCLE

BACKGROUND OF THE INVENTION

(1) Field of the Invention

The invention relates to a technical field of an automatic return structure for chain detachment of a bicycle, and more particularly to an automatic return structure for chain detachment of a bicycle, wherein a chain of the bicycle upon detachment can be automatically upshifted when a rider continuously pedals the pedals, so that the danger of the sudden slowdown upon chain detachment can be reduced, and the troubles of getting off the bicycle and manually upshifting the chain can be avoided.

(2) Description of the Prior Art

When a conventional bicycle encounters the condition of chain detachment upon running, the sudden slowdown is caused until the bicycle stops because the driving force disappears, or even the bicycle may suddenly stop when the chain gets jammed. The condition of the sudden slowdown or sudden stop caused by the chain detachment tends to cause the danger of chasing when the rear car is too late to dodge. More particularly, the condition of the chain detachment needs to be eliminated by the rider who is riding the conventional bicycle and needs to get off the bicycle to manually upshift the chain upon chain detachment, so that the rider can further ride the bicycle. Getting off the bicycle to manually upshift the chain is time and labor consuming, and further makes the hands become dirty in a very trouble and inconvenient manner. More particularly, it further wastes the time to cause serious delay upon competition, thereby affecting competition result.

SUMMARY OF THE INVENTION

A main objective of the invention is to solve the problem of the conventional bicycle upon chain detachment, which disables the real-time upshifting and causes the danger of chasing of the rear car due to the sudden slowdown or sudden stop, wherein the rider needs to get off to perform the manual upshifting in a time and labor consuming manner, and the hands get dirty in a very troublesome manner.

The invention provides an automatic return structure for chain detachment of a bicycle, which includes a crank, a sprocket, a stopper block and a guide block. An outer surface of one end of the crank is combined with a pedal. The sprocket is combined with and fixed to an inner surface of the other end of the crank and can be driven by the crank to rotate. The sprocket is wound with a chain. The stopper block is disposed on the other end of the crank, so that a groove is formed on a circumferential surface of the other end of the crank and between the stopper block and the sprocket. The groove stops the chain on the other end of the crank upon chain detachment. The guide block is disposed on an inner surface of a middle portion of the crank. A gap, through which one side chain plate of the chain can pass, is kept between a lower portion of the guide block and the sprocket. An upper portion of the guide block is higher than an outer peripheral surface of the sprocket and has an arced guide surface. When the guide block is moved upward to a predetermined height together with the crank, the chain can be lifted up to an upper side of the sprocket, and then slides downward along the arced guide surface and be snapped to teeth of the sprocket to form an automatic upshifting state.

In the automatic return structure for chain detachment of the bicycle provided by the invention, when the condition of chain detachment occurs, the stopper block blocks the chain. Then, the pedal is continuously pedaled to make the guide block lift up the chain to a location above the sprocket, so that the chain slides downward along the arced guide surface and is automatically upshifted. Thus, the danger of chasing caused by the sudden slowdown or stop upon chain detachment can be avoided, the rider needs not to get off to perform the manual upshifting, and the riding convenience can be significantly enhanced. More particularly, a lot of upshifting time can be saved upon competition, so that the competition result can be enhanced.

Further aspects, objects, and desirable features of the invention will be better understood from the detailed description and drawings that follow in which various embodiments of the disclosed invention are illustrated by way of examples.

DETAILED DESCRIPTION OF THE PREFERRED EMBODIMENTS

Figure 1:
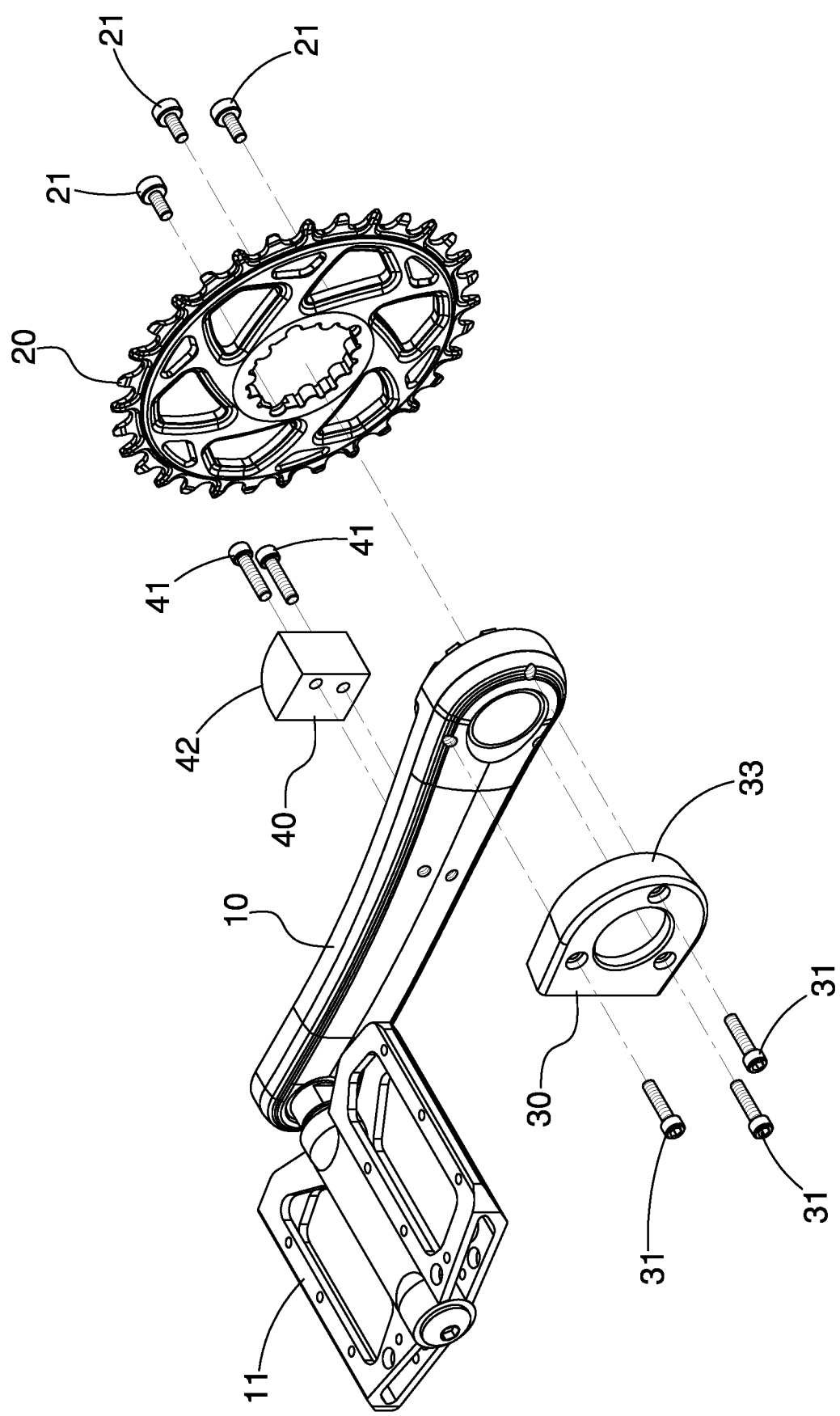
FIG. 1 is a pictorially schematic decomposed view showing a first embodiment of the invention.
Figure 2:
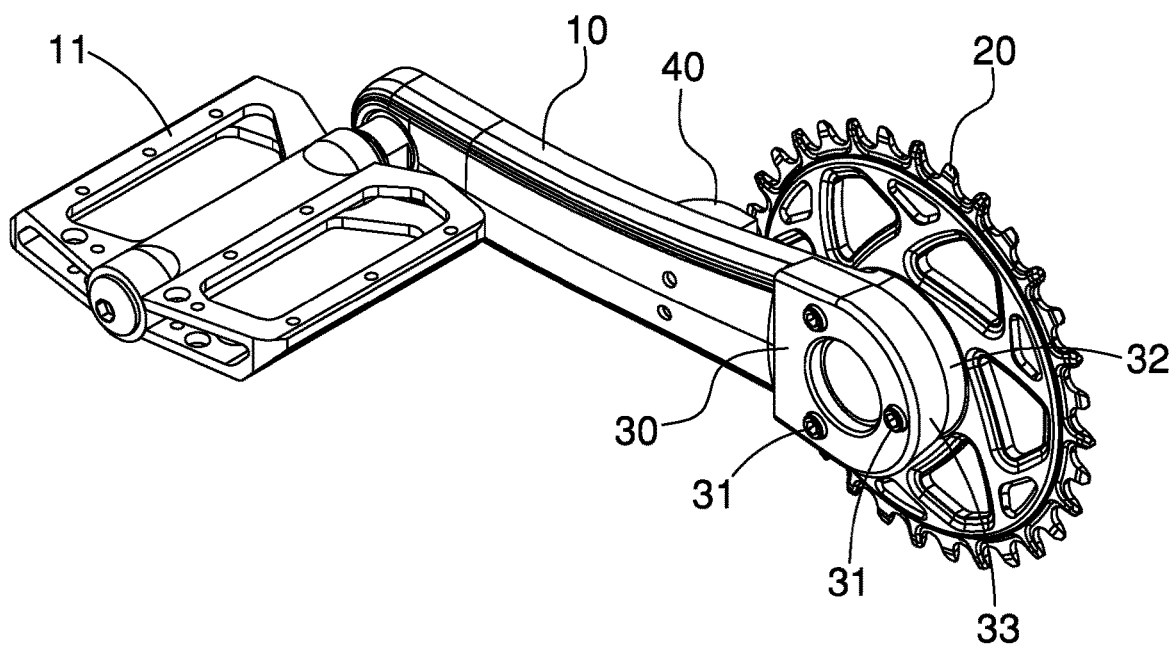
FIG. 2 is a pictorially schematic assembled view showing the first embodiment of the invention.
Figure 3:
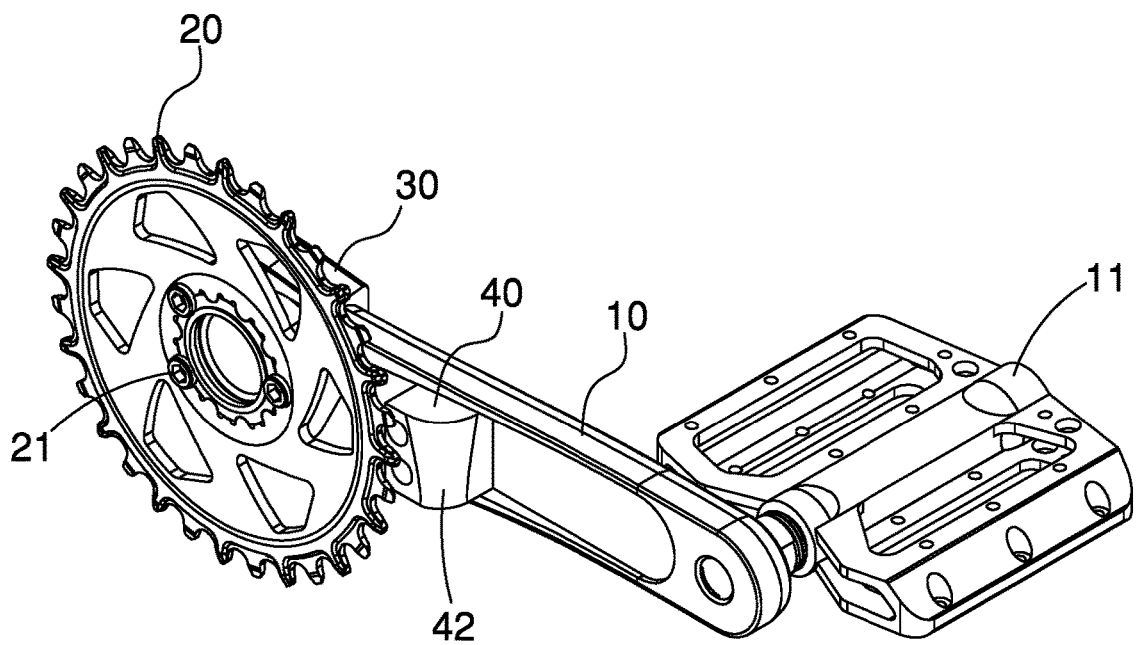
FIG. 3 is a pictorially schematic assembled view showing a rear side of the first embodiment of the invention.

FIGS. 1 to 7 show an automatic return structure for chain detachment of a bicycle according to a first embodiment of the invention. Referring to FIGS. 1 to 5, the automatic return structure for chain detachment of the bicycle according to this embodiment includes a crank 10, a sprocket 20, a stopper block 30 and a guide block 40.

An outer surface of one end of the crank 10 is combined with a pedal 11.

The sprocket 20 is combined with and fixed to the inner surface of the other end of the crank 10 through multiple sprocket bolts 21, so that the crank 10 drives the sprocket 20 to rotate. The sprocket 20 is wound with a chain 22.

The stopper block 30 is fixed to the other end of the crank 10 by way of screwing through multiple stopper block bolts 31, so that a groove 32 is formed on the circumferential surface of the other end of the crank 10 and between the stopper block 30 and the sprocket 20. The groove 32 blocks the chain 22 on the other end of the crank 10 upon chain detachment to prevent the chain 22 from falling to the outer surface of the crank 10. The circumferential surface of the stopper block 30 is formed with a bevel guide 33 gradually descending from outside to inside so that the effect of stopping and blocking the chain 22 can be further enhanced. In this invention, the groove 32 may also be directly formed on the circumferential surface of the stopper block 30. This is only the simple modification of the above-mentioned structure, and detailed descriptions thereof will be omitted.

The guide block 40 is fixed to the inner surface of the middle portion of the crank 10 by way of screwing through multiple guide block bolts 41. A gap, through which one side chain plate of the chain 22 passes, is kept between a lower portion of the guide block and the sprocket 20. An upper portion of the guide block is higher than the outer peripheral surface of the sprocket 20, and has an arced guide surface 42. The arced surface of the arced guide surface 42 gradually reduces from front to rear. When the guide block 40 is lifted, by the crank 10, up to a height, the chain 22 is lifted up to the upper side of the sprocket 20, and then slides downward along the arced guide surface 42 and is snapped to the teeth of the sprocket 20 to form the upshifting state.

Figure 4:
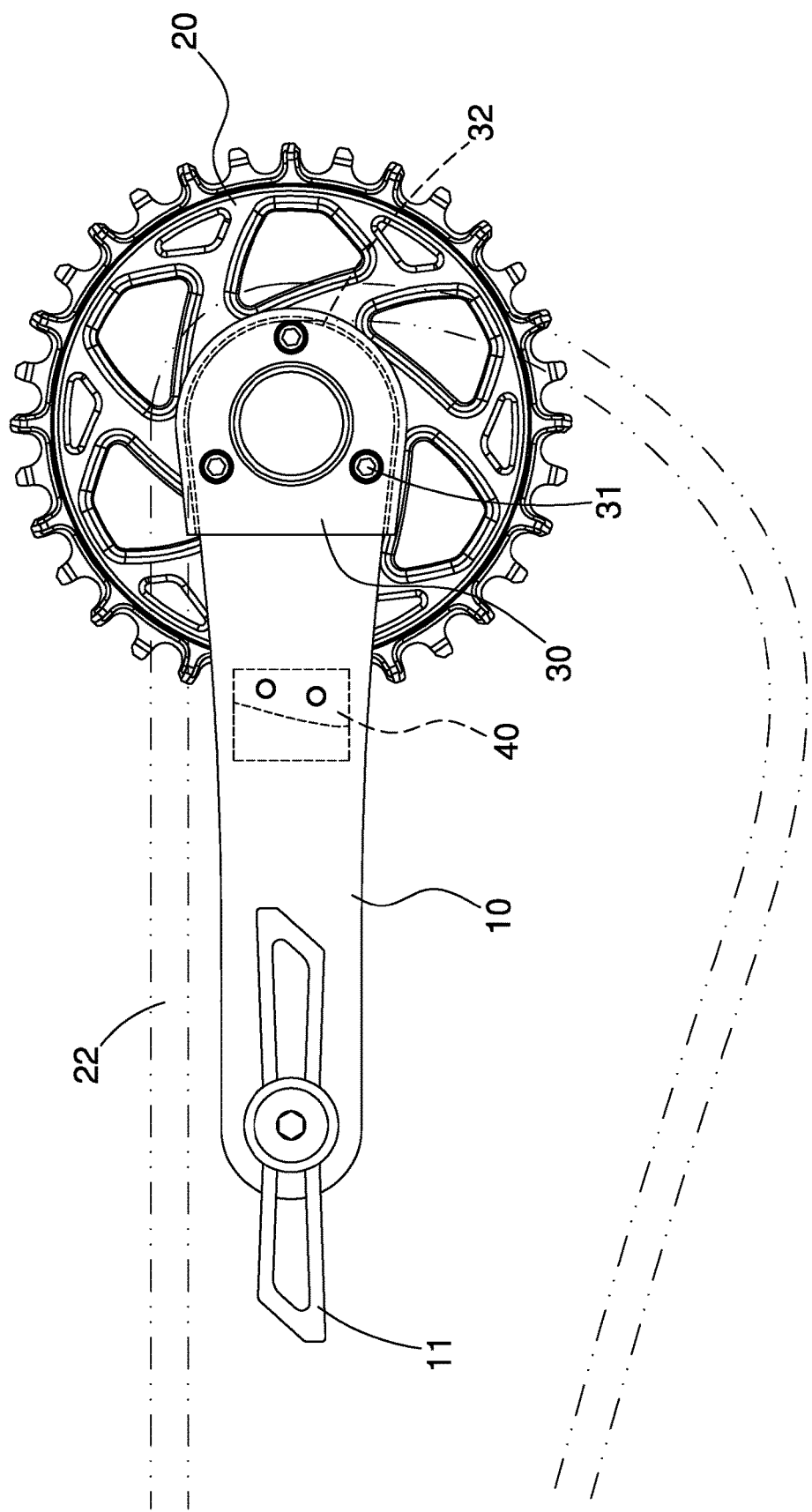
FIG. 4 is a schematic operation front view showing the first embodiment of the invention upon chain detachment.
Figure 5:
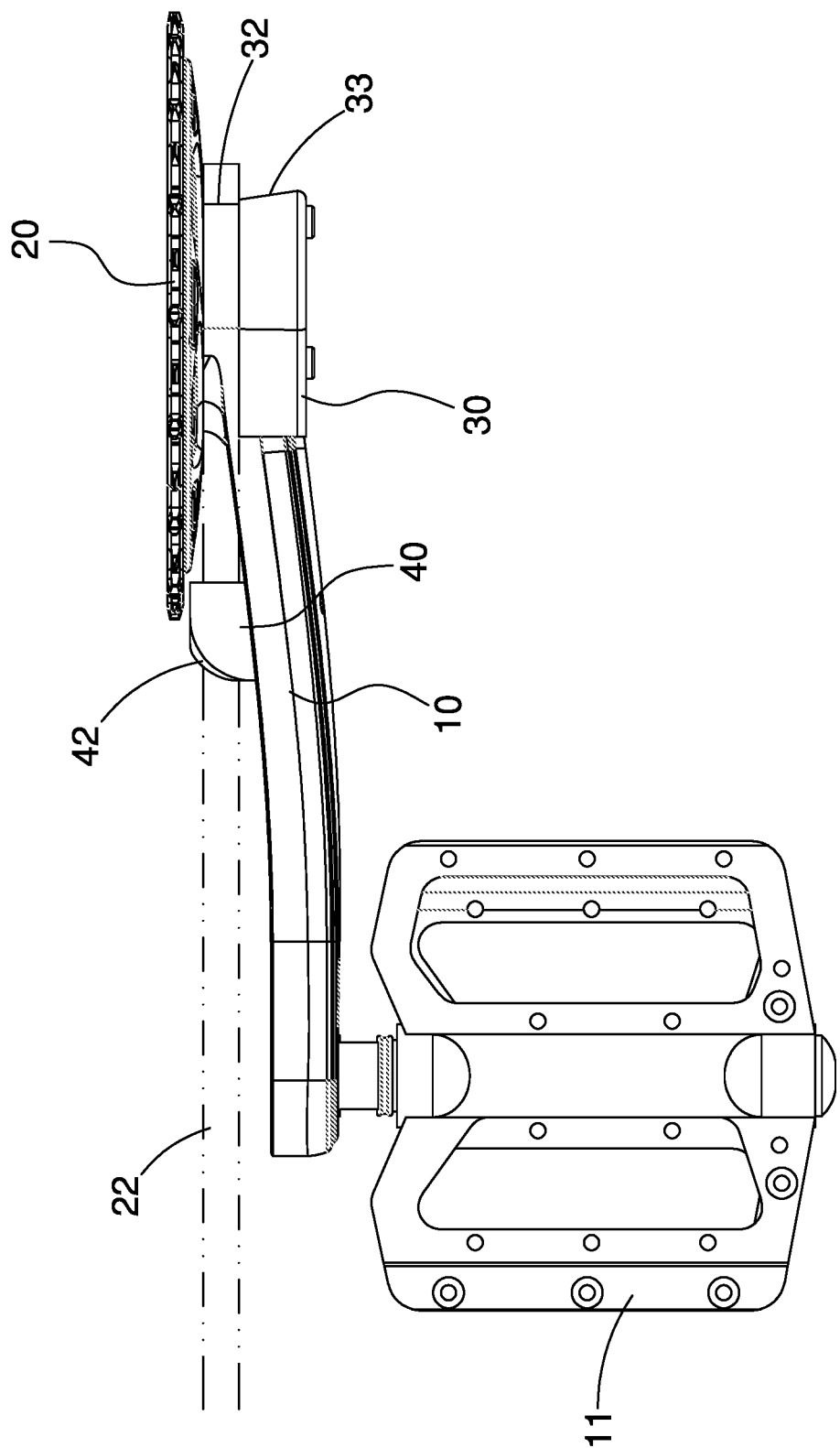
FIG. 5 is a schematic top view of FIG. 4.

As shown in FIGS. 4 and 5, upon chain detachment of the bicycle, the chain 22 is stopped at the groove 32 formed between the stopper block 30 and the sprocket 20.

Figure 6:
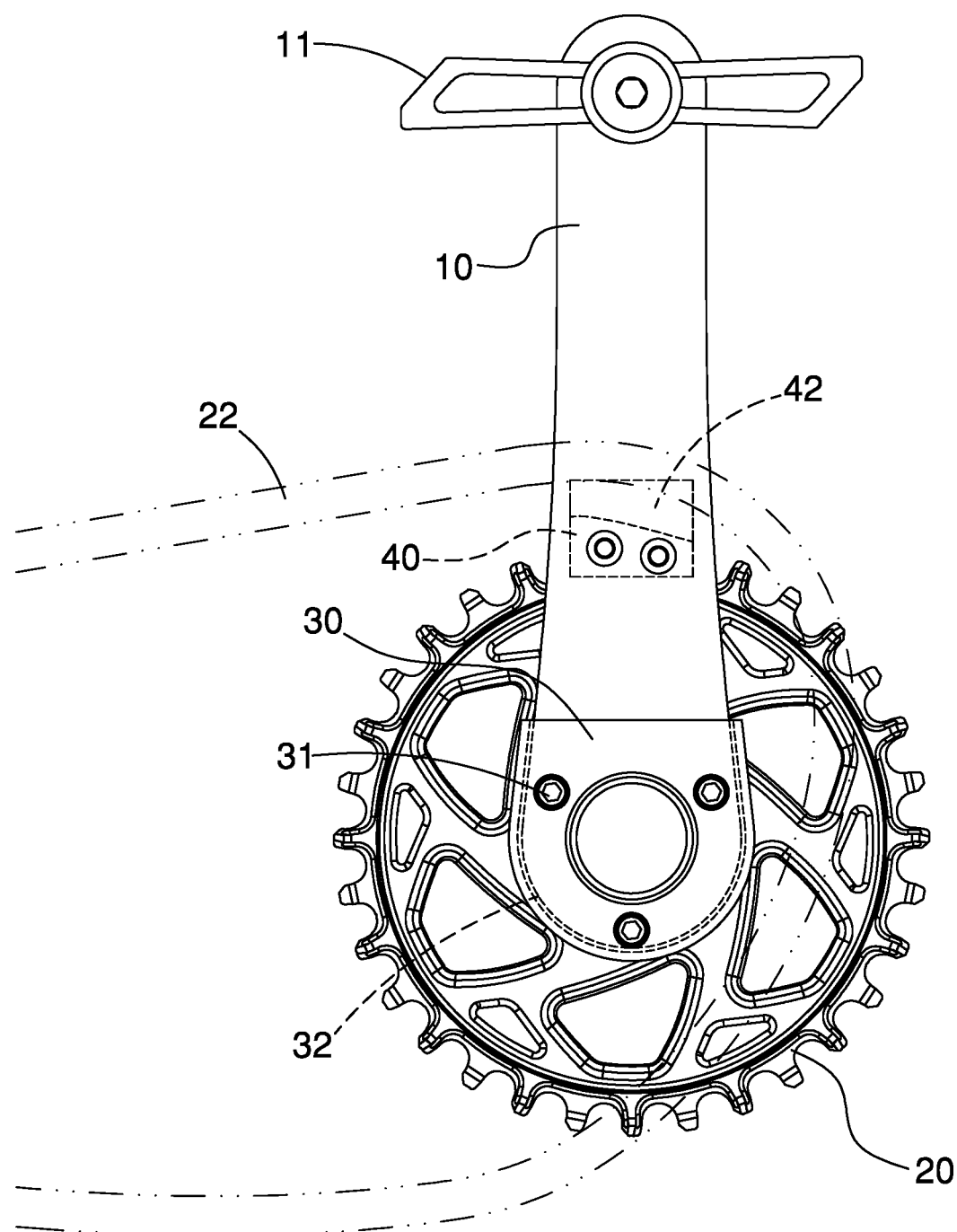
FIG. 6 is a schematic operation front view showing automatic upshifting in the first embodiment of the invention.
Figure 7:
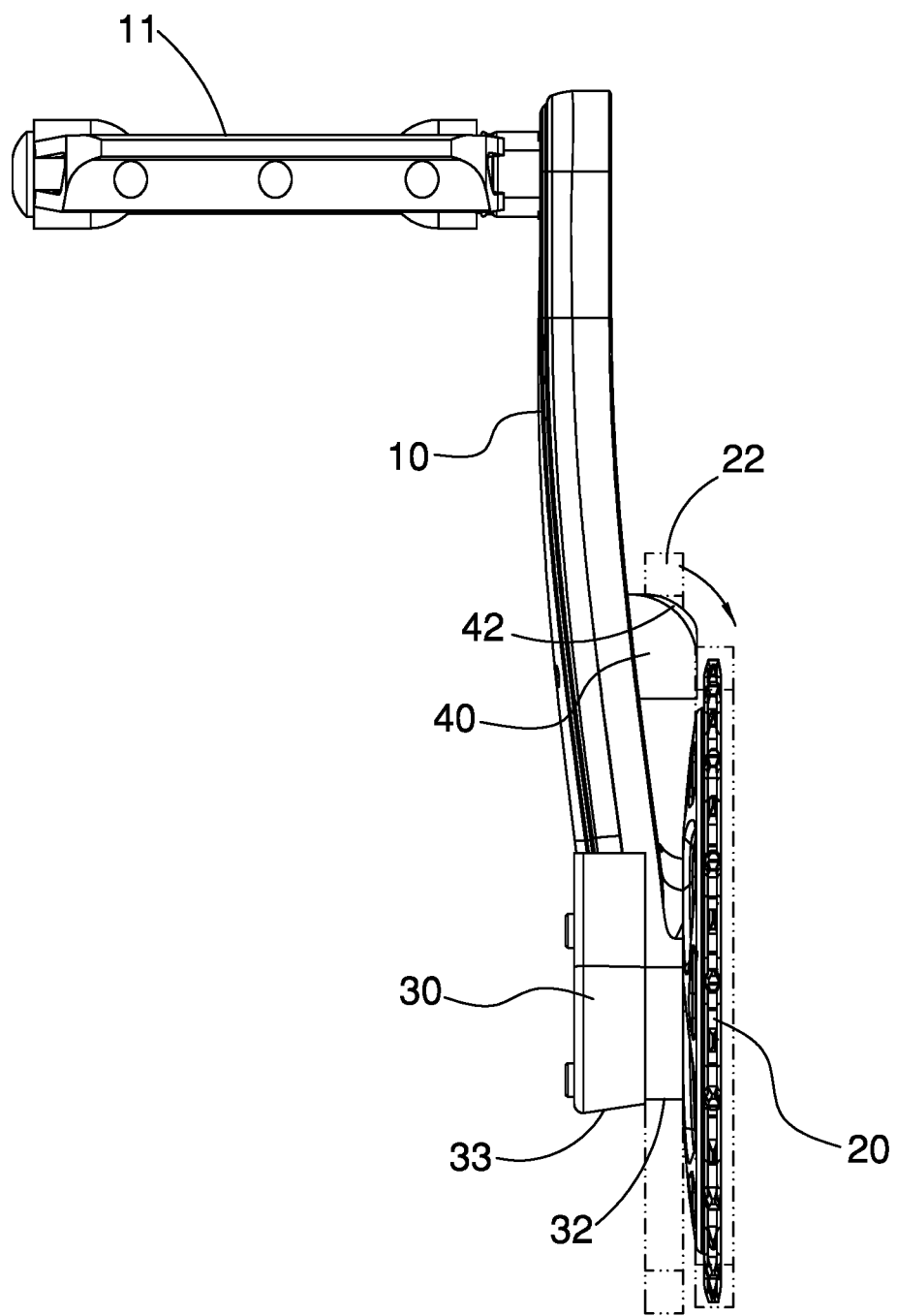
FIG. 7 is a schematic right-side view of FIG. 6.

As shown in FIGS. 6 and 7, when the rider continuously pedals the pedal 11 on the other side of the crank 10 to rotate the crank 10 clockwise upon chain detachment, the guide block 40 combined with the inner side of the crank 10 is shifted upward with the rotation of the crank 10, and thus lifts up the chain 22 to a location above the sprocket 20. Thus, the chain 22 slides downward along the arced guide surface 42 and is snapped to the teeth of the sprocket 20 to form an automatic upshifting state.

In the automatic return structure for chain detachment of the bicycle provided by the invention, when the condition of the chain detachment occurs, the stopper block 30 firstly blocks the chain 22, and then the rider continuously pedals the pedal 11 to make the guide block 40 lift up the chain 22 to the location above the sprocket 20, so that the chain 22 slides downward along the arced guide surface 42 and is automatically upshifted. Thus, the danger of chasing caused by the sudden slowdown or stop upon chain detachment can be avoided, the rider needs not to get off to perform the manual upshifting, and the riding convenience can be significantly enhanced. More particularly, a lot of upshifting time can be saved upon competition, so that the competition result can be enhanced.

Figure 8:
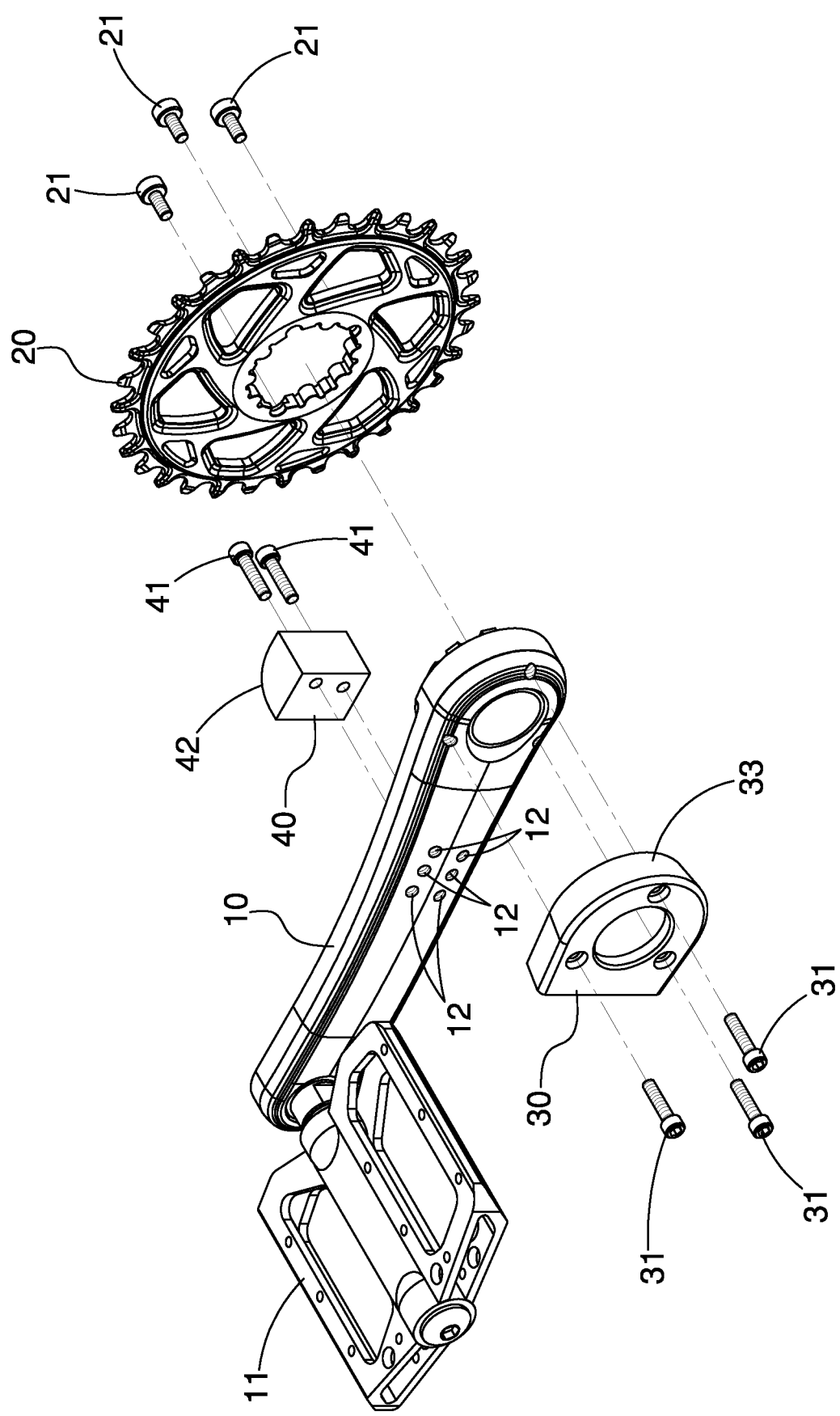
FIG. 8 shows a second embodiment of the invention.

Referring to FIG. 8, the automatic return structure for chain detachment of the bicycle according to the second embodiment of the invention is substantially the same as the first embodiment except for the difference that the crank 10 of this embodiment is formed with multiple screw holes 12 separately disposed, and that the guide block bolts 41 can be selectively screwed to the screw holes, so that the guide block 41 can be combined with a corresponding proper position of the crank 10 in correspondence with different dimensions of sprockets 20.

Figure 9:
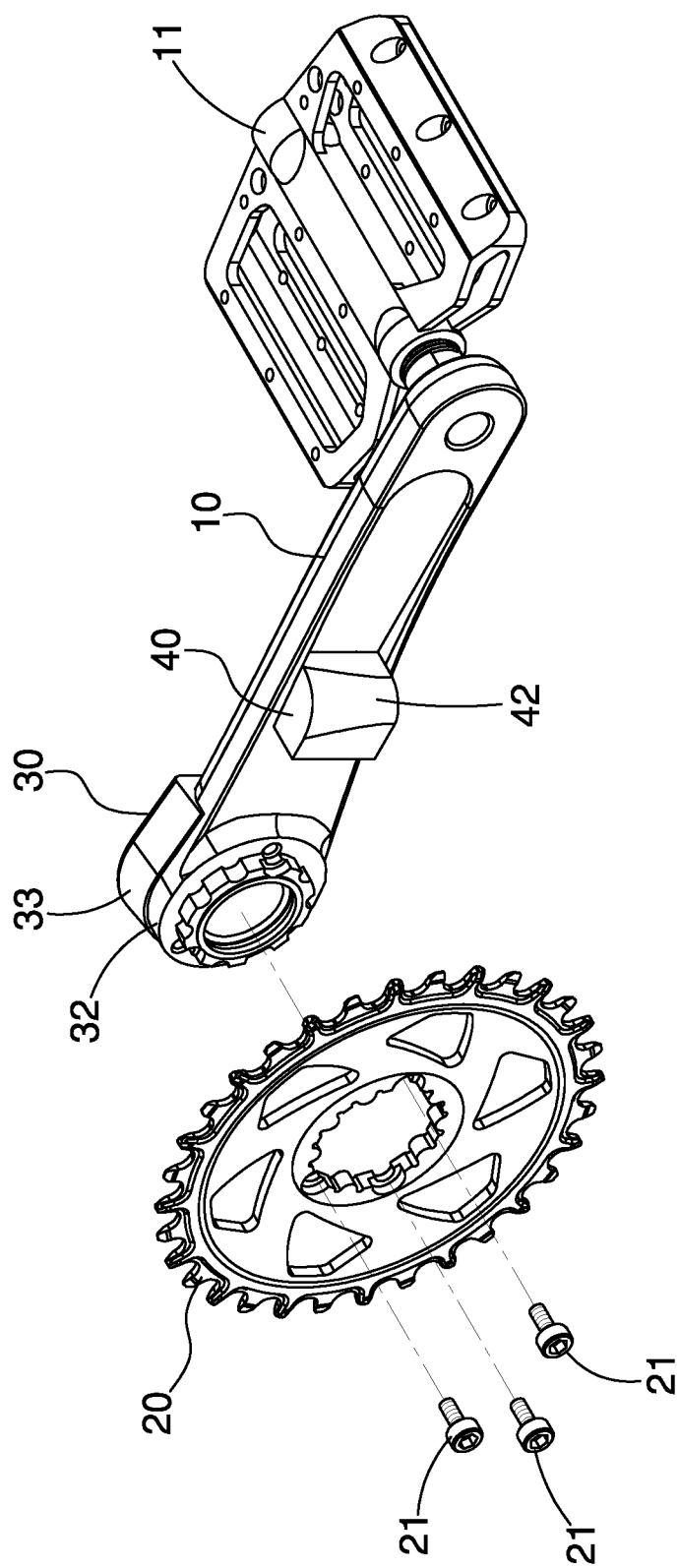
FIG. 9 shows a third embodiment of the invention.

Referring to FIG. 9, the automatic return structure for chain detachment of the bicycle according to the third embodiment of the invention is substantially the same as the first embodiment except for the difference that the stopper block 30 and the guide block 40 of this embodiment are integrally formed on the crank 10. In this embodiment, of course, it is also possible that only one of the stopper block 30 and the guide block 40 is integrally formed on the crank 10, and detailed descriptions thereof will be omitted.

Figure 10:
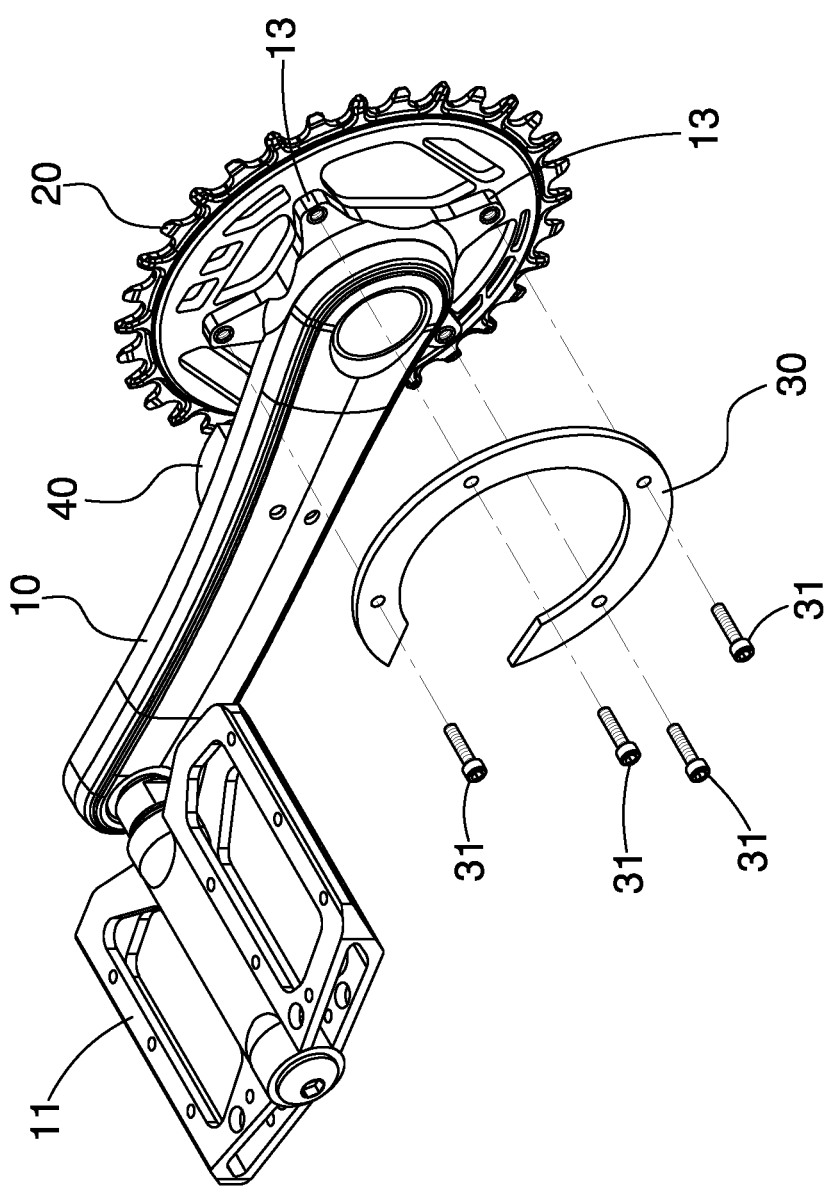
FIG. 10 is a pictorially schematic decomposed view showing a fourth embodiment of the invention.
Figure 11:
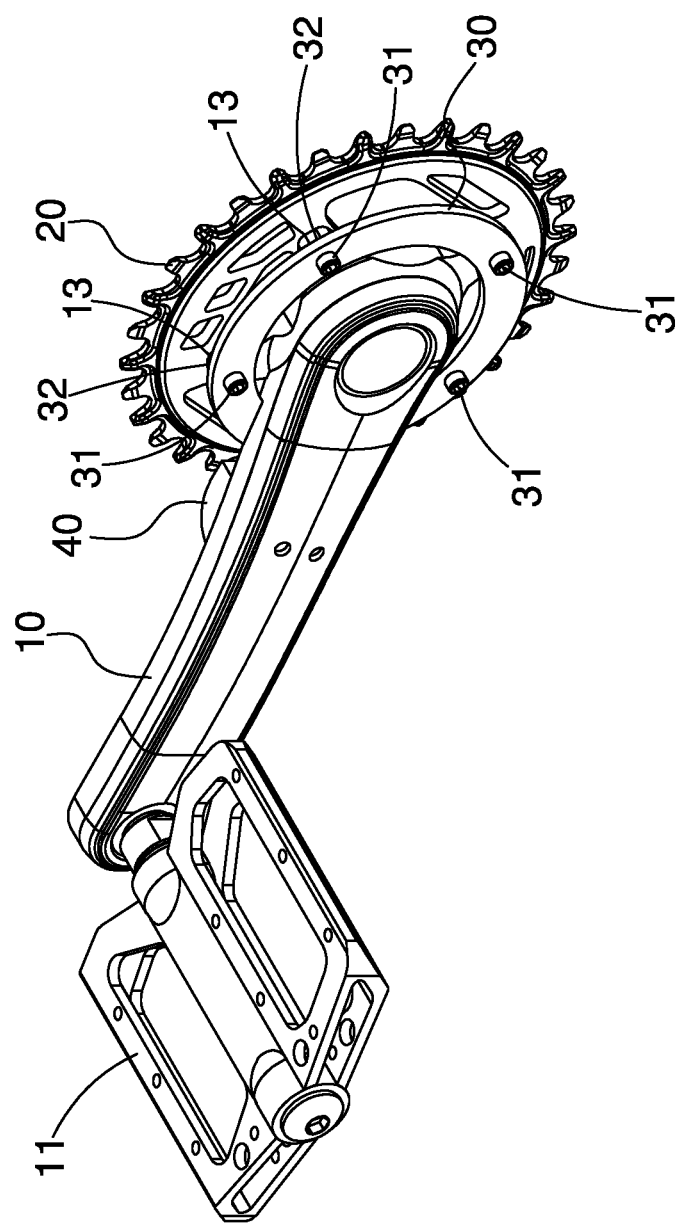
FIG. 11 is a pictorially schematic assembled view showing the fourth embodiment of the invention.

Referring to FIGS. 10 and 11, the automatic return structure for chain detachment of the bicycle according to the fourth embodiment of the invention is substantially the same as the first embodiment except for the difference that the other end of the crank 10 of this embodiment extends to form multiple fixing claws 13 to be combined with the sprocket 20, that the stopper block 30 is a C-shaped annular sheet screwed to the fixing claws 13 through the stopper block bolts 31, and that the periphery of the stopper block 30 projectingly extends to form end surfaces of the fixing claws 13, so that multiple grooves 32 are formed on the end surfaces of the fixing claws 13 and between the stopper block 30 and the sprocket 20, and that the chain 22 can be stopped on the fixing claws 13 of the other end of the crank 10 upon chain detachment.

Figure 12:
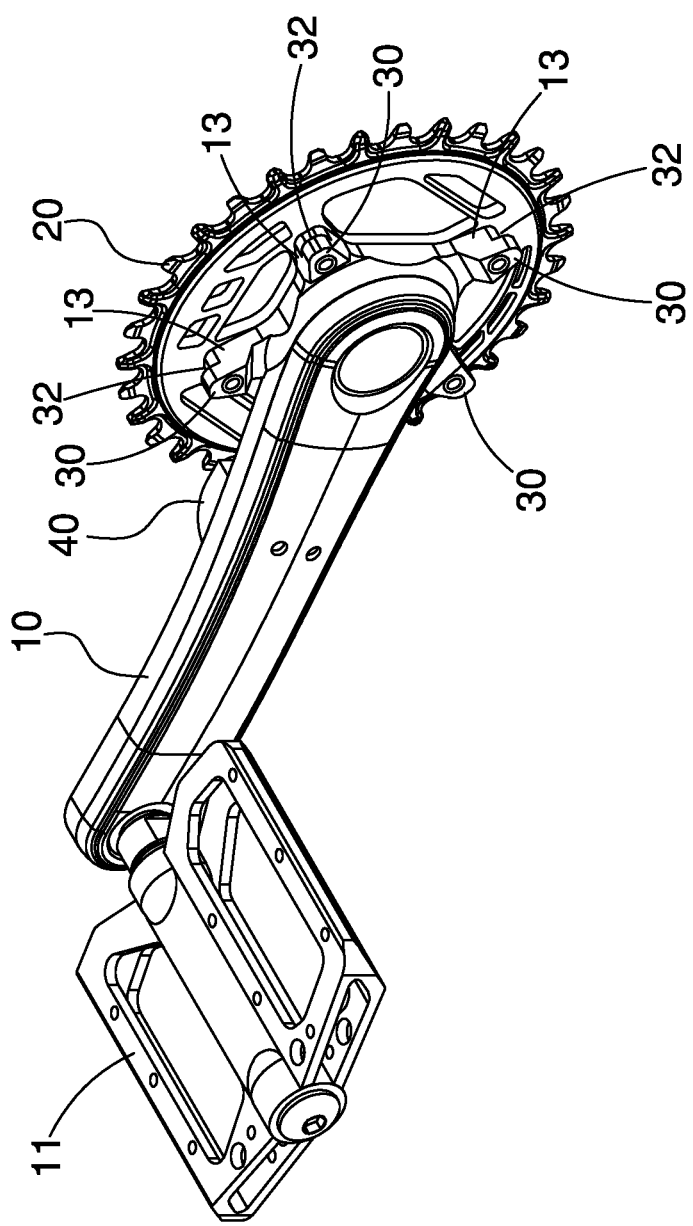
FIG. 12 shows a fifth embodiment of the invention.

Referring to FIG. 12, the automatic return structure for chain detachment of the bicycle according to the fifth embodiment of the invention is substantially the same as the first embodiment except for the difference that the other end of the crank 10 of this embodiment extends to form multiple fixing claws 13 to be combined with the sprocket 20, that end portions of the fixing claws 13 are integrally and projectingly formed with multiple stopper blocks 30, respectively, that end portions of the stopper blocks 30 projectingly extend to form the end surfaces of the fixing claws 13, so that multiple grooves 32 are formed on the end surfaces of the fixing claws 13 and between the stopper blocks 30 and the sprocket 20 to stop the chain 22 on the multiple fixing claws 13 on the other end of the crank 10 upon chain detachment.

In summary, the invention has the above-mentioned advantages and practical values, and no similar products are published, so that the application requirements of the invention patent have been satisfied, and the application is filed according to the law.

What is claimed is:

1. An automatic return structure for chain detachment of a bicycle, the automatic return structure comprising:
    a crank having first and second end portion, wherein an outer surface of the first end portion of the crank is combined with a pedal;
    a sprocket, which is combined with and fixed to an inner surface of the second end portion of the crank and can be driven by the crank to rotate, wherein the sprocket is wound with a chain;
    a stopper block disposed on the second end portion of the crank, so that a groove is formed on a circumferential surface of the second end portion of the crank between the stopper block and the sprocket, wherein the groove captures the chain on the second end portion of the crank upon chain detachment from the sprocket; and
    a guide block disposed on an inner surface of a middle portion of the crank, wherein a gap, through which one side chain plate of the chain can pass, is kept between a lower portion of the guide block and the sprocket, and an upper portion of the guide block is higher than an outer peripheral surface of the sprocket and has an arced guide surface, wherein when the guide block is moved upward to a predetermined height together with the crank, the guide block lifts up the chain to an upper side of the sprocket, and makes the chain slide downward along the arced guide surface and be snapped to teeth of the sprocket to form an automatic upshifting state.

2. The automatic return structure according to claim 1, wherein the sprocket is combined with and fixed to the crank through multiple sprocket bolts.

3. The automatic return structure according to claim 1, wherein a circumferential surface of the stopper block is formed with a bevel guide gradually descending from outside to inside to further enhance a chain stopping effect.

4. The automatic return structure according to claim 1, wherein the stopper block is integrally formed on the crank.

5. The automatic return structure according to claim 1, wherein the guide block is integrally formed on the crank.

6. The automatic return structure according to claim 4, wherein the guide block is integrally formed on the crank.

7. The automatic return structure according to claim 1, wherein the stopper block is screwed and fixed to the crank through multiple stopper block bolts.

8. The automatic return structure according to claim 7, wherein the other end of the crank extends to form multiple fixing claws to be combined with the sprocket, and the stopper block is a C-shaped annular sheet, and is screwed to the fixing claws through the stopper block bolts, so that a periphery of the stopper block projectingly extends to form end surfaces of the fixing claws, that multiple grooves are formed on the end surfaces of the fixing claws and between the stopper block and the sprocket, and that the chain can be stopped on the fixing claws of the other end of the crank upon chain detachment.

9. The automatic return structure according to claim 1, wherein the guide block is fixed onto the crank by way of screwing through multiple guide block bolts.

10. The automatic return structure according to claim 9, wherein the crank is formed with multiple screw holes separately disposed, and the guide block bolts can be selectively screwed to the screw holes, so that the guide block can be combined with a corresponding proper position of the crank in correspondence with different dimensions of sprockets.

11. The automatic return structure according to claim 1, wherein an arced surface of the arced guide surface gradually reduces from front to rear.

* * * * *